(12) United States Patent
Yue et al.

(10) Patent No.: US 9,718,604 B2
(45) Date of Patent: Aug. 1, 2017

(54) PACKING BOX

(71) Applicant: Shenzhen China Star Optoelectronics Technology Co., Ltd., Shenzhen, Guangdong (CN)

(72) Inventors: Liang Yue, Guangdong (CN); Shihhsiang Chen, Guangdong (CN); Yuchun Hsiao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 277 days.

(21) Appl. No.: 14/396,755

(22) PCT Filed: Sep. 4, 2014

(86) PCT No.: PCT/CN2014/085898
§ 371 (c)(1),
(2) Date: Oct. 24, 2014

(87) PCT Pub. No.: WO2016/026170
PCT Pub. Date: Feb. 25, 2016

(65) Prior Publication Data
US 2016/0052672 A1    Feb. 25, 2016

(30) Foreign Application Priority Data
Aug. 21, 2014 (CN) .......................... 2014 1 0416320

(51) Int. Cl.
*B65D 85/30* (2006.01)
*B65D 85/48* (2006.01)
(Continued)

(52) U.S. Cl.
CPC ......... *B65D 85/48* (2013.01); *B65D 21/0215* (2013.01); *B65D 1/42* (2013.01);
(Continued)

(58) Field of Classification Search
CPC .... B65D 85/30; B65D 81/058; B65D 81/124; B65D 81/24; B65D 81/05; B65D 81/053;
(Continued)

(56) References Cited

U.S. PATENT DOCUMENTS 4,736,861 A * 4/1988 Basili ................. B65D 21/0217
206/404
5,860,527 A   1/1999 Frankenberg
(Continued)

FOREIGN PATENT DOCUMENTS

CN          103732504 A    4/2014

*Primary Examiner* — Fenn Mathew
*Assistant Examiner* — Elizabeth Volz
(74) *Attorney, Agent, or Firm* — Andrew C. Cheng

(57) ABSTRACT

A packing box is disclosed. The packing box includes a box body having an inward concave forming four blocking portions at four sides, and a plurality of supporting members. The supporting member includes a big head end and a small head end fixedly connecting to the blocking portions. The small head end is arranged above an up surface of the blocking portion. A bottom surface of the big head end comprises an inward concave, the small head end of the supporting member of the packing box located at a lower altitude engages with the big head end of the supporting member of the packing box located at a higher altitude when the packing boxes are stacked.

13 Claims, 2 Drawing Sheets

(51) Int. Cl.
*B65D 1/42* (2006.01)
*G02F 1/1333* (2006.01)
*B65D 81/127* (2006.01)
*B65D 21/02* (2006.01)
*B65D 81/05* (2006.01)
*B65D 81/24* (2006.01)
*B65D 81/02* (2006.01)

(52) U.S. Cl.
CPC ...... *B65D 21/0209* (2013.01); *B65D 21/0212* (2013.01); *B65D 81/025* (2013.01); *B65D 81/05* (2013.01); *B65D 81/053* (2013.01); *B65D 81/054* (2013.01); *B65D 81/127* (2013.01); *B65D 81/24* (2013.01); *B65D 85/30* (2013.01); *B65D 2585/6837* (2013.01); *G02F 1/133308* (2013.01); *Y10S 206/811* (2013.01)

(58) Field of Classification Search
CPC .......... B65D 81/054; B65D 2585/6837; B65D 21/0209; B65D 85/48; B65D 21/0212; B65D 21/0215; Y10S 206/811; G02F 1/133308
USPC ...... 206/454, 511, 509, 512; 220/17.1, 4.26, 220/4.27
See application file for complete search history.

(56) References Cited

U.S. PATENT DOCUMENTS

2013/0299375 A1* 11/2013 Chen ................. B29C 33/48
                                                206/454
2014/0263885 A1*  9/2014 Oltman ............... B65D 25/24
                                                248/188.8

* cited by examiner

PACKING BOX

BACKGROUND OF THE INVENTION

1. Field of the Invention

The present disclosure relates to packing technology, and more particularly to a packing box.

2. Discussion of the Related Art

Currently, liquid crystal panels are packed by packing boxes manufactured by blow-formed process when being shipped out. Thus, the anti-pressure capability of such packing boxes has to be considered for the reason that a plurality of liquid crystal glasses are stacked within the packing box.

In order to enhance the anti-pressure capability of the packing box so as to increase the number of liquid crystal glasses that can be stacked, one solution is to increase the thickness of the walls of the blow-formed packing box. However, such design may increase the weight of the packing box, which makes the transportation more difficult. The weight of the packing box may be decreased by hollowing out the middle of the packing box, but which cannot enhance the anti-pressure capability of the packing box. Thus, it is critical to enhance the carrying capability of the blow-formed packing box without increasing the thickness of the walls.

SUMMARY

The object of the claimed invention is to provide a packing box with lower cost, higher anti-pressure capability without increasing the thickness of the walls of the packing box.

In one aspect, a packing box, comprising: a box body comprising an inward concave forming four blocking portions at four sides; and a plurality of supporting members comprises a big head end and a small head end fixedly connecting to the blocking portions, the small head end is arranged above an up surface of the blocking portion, a bottom surface of the big head end comprises an inward concave, the small head end of the supporting member of the packing box located at a lower altitude engages with the big head end of the supporting member of the packing box located at a higher altitude when the packing boxes are stacked.

Wherein the blocking portion comprises a plurality of through holes and blind holes arranged along a vertical direction, a diameter of the through hole is smaller than the diameter of the blind hole, the small head end and the big head end of the supporting member are respectively a first supporting member and a second supporting member, the second supporting member is inserted to the blind hole, and the first supporting member and the second supporting member form a screw connection to clasp the box body.

Wherein the second supporting member comprises a pillar having exterior threading, the first supporting member is arranged with interior threading, and the pillar passes through the through hole to connect with the first supporting member.

Wherein a bottom surface of the second supporting member aligns with the box body.

Wherein the up surface of the box body is arranged with a ribbed slab, the bottom surface of the box body dents inward to form a step portion corresponding to the ribbed slab, the ribbed slab of the packing box located at the lower attitude is within the step portion of the packing box located at the higher altitude.

Wherein internal walls of at least one pair of opposite blocking portions of the box body are arranged with bosses protruding toward a middle of the box body.

Wherein a bottom plate of the box body adjacent to the blocking portion is lower than a middle surface.

Wherein a middle of the box body is hollow.

Wherein the supporting members are arranged at four corners of the box body.

Wherein the supporting members and the box body are integrally blow-formed.

The structure of the packing box is simple and the cost of the packing box is low for the reason that a plurality of supporting members has been arranged on the box body of the packing box. The carrying capability of the packing box may be enhanced without increasing the thickness of the walls of the box body.

DETAILED DESCRIPTION OF THE EMBODIMENTS

Embodiments of the invention will now be described more fully hereinafter with reference to the accompanying drawings, in which embodiments of the invention are shown.

Figure 1:
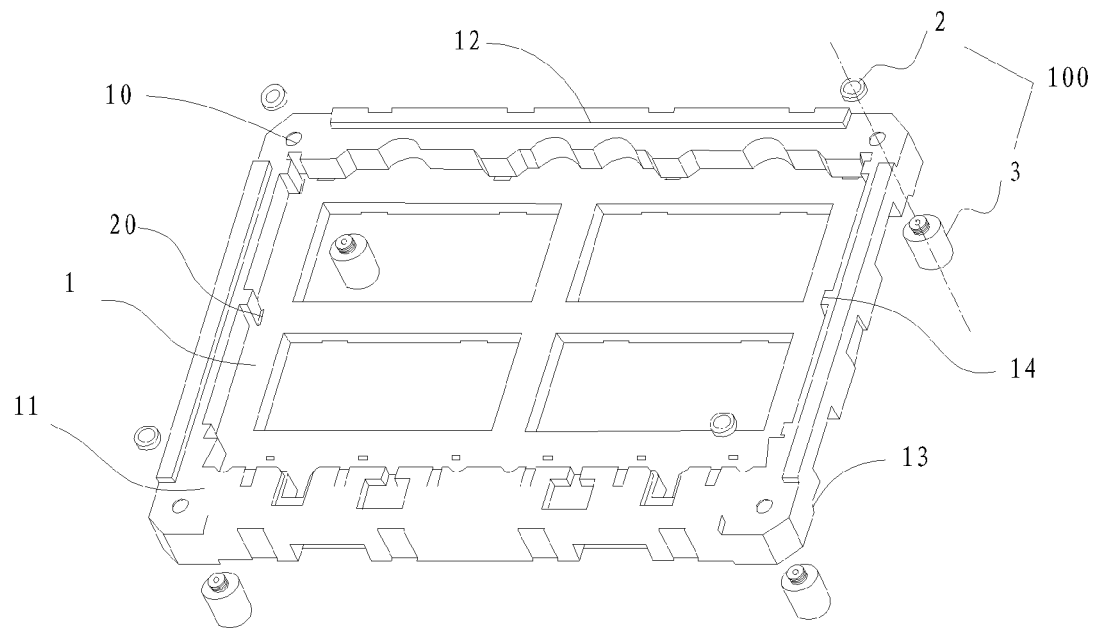
FIG. 1 is an exploded view of the packing box in accordance with one embodiment.

FIG. 1 is an exploded view of the packing box in accordance with one embodiment. The packing box includes a box body 1 and a plurality of supporting members 100. The box body 1 includes an inward concave forming four blocking portions 11 at four sides. The supporting member 100 includes a big head end and a small head end fixedly connecting to the blocking portion 11. The small head end is arranged above an up surface of the blocking portion 11. A bottom surface of the big head end has an inward concave. When a plurality of packing boxes are stacked, the small head end of the supporting member 100 of the packing box located at a lower altitude engages with the big head end of the supporting member 100 of the packing box located at a higher altitude.

By arranging the supporting members 100, the bearing capacity of the packing box is enhanced such that the number of the liquid crystal glasses that can carried by the packing box is also increased. When the packing boxes are stacked, the supporting members 100 engage with each other, which not only increase the engaging precisions between the packing boxes, but also decreased the stacked dimension of the packing boxes.

In one embodiment, the packing box includes four supporting members 100 which are respectively arranged at four corners of the box body 1.

Figure 2:
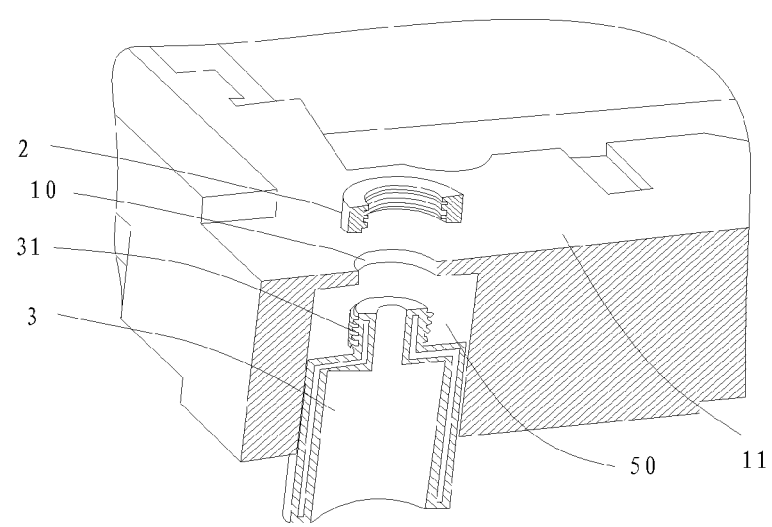
FIG. 2 is a schematic view of the supporting member of the packing box of FIG. 1.

Referring to FIG. 2, the blocking portion 11 includes a plurality of through holes 10 and blind holes 50 arranged along a vertical direction. The diameter of the through hole 10 is smaller than that of the blind hole 50. In the embodiment, the small head end and the big head end of the supporting member 100 are respectively a first supporting member 2 and a second supporting member 3. The second supporting member 3 is inserted to the blind hole 50, and the first supporting member 2 and the second supporting member 3 form a screw connection so as to clasp the box body 1 therebetween.

In other embodiments, the big head end is inserted within the blind holes 50, and the small head end and the through hole 10 form the screw connection via the through hole 10. Thus, the small head end protrudes from the up surface of the blocking portion 11.

One of the first supporting member 2 and the second supporting member 3 is arranged with a pillar 31 having exterior threading. The other one of the first supporting member 2 and the second supporting member 3 is arranged with interior threading. The pillar 31 passes through the through hole 10 and engages with the interior threading. In the embodiment, the pillar 31 is arranged above the second supporting member 3.

The bottom surface of the second supporting member 3 aligns with the box body 1. When the packing boxes are stacked, the first supporting member 2 of the packing box located at a lower altitude inserts into a bottom end of the second supporting member 3 of the packing box located at a higher altitude such that there is no gap between the packing boxes.

In other embodiments, the length of the second supporting member 3 is a little bit longer. After the supporting member 100 is inserted into the box body 1, a portion of the second supporting member 3 protrudes from the box body 1 such that there is a gap between the stacked packing boxes.

Figure 3:
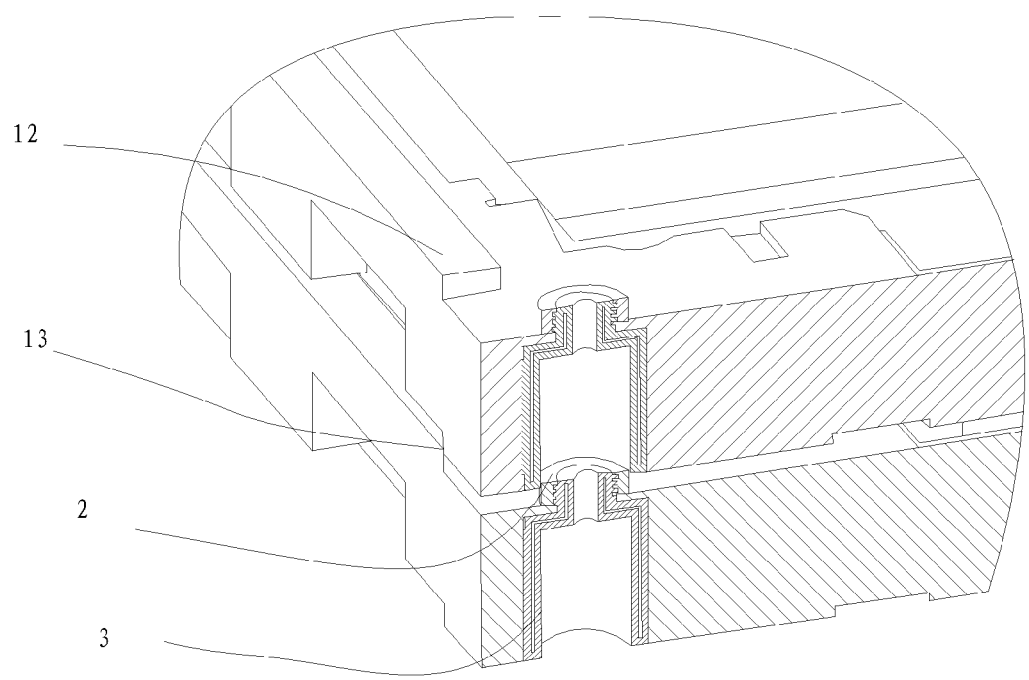
FIG. 3 is a cross-sectional view showing the process of stacking a plurality of packing boxes of FIG. 1.
Figure 4:
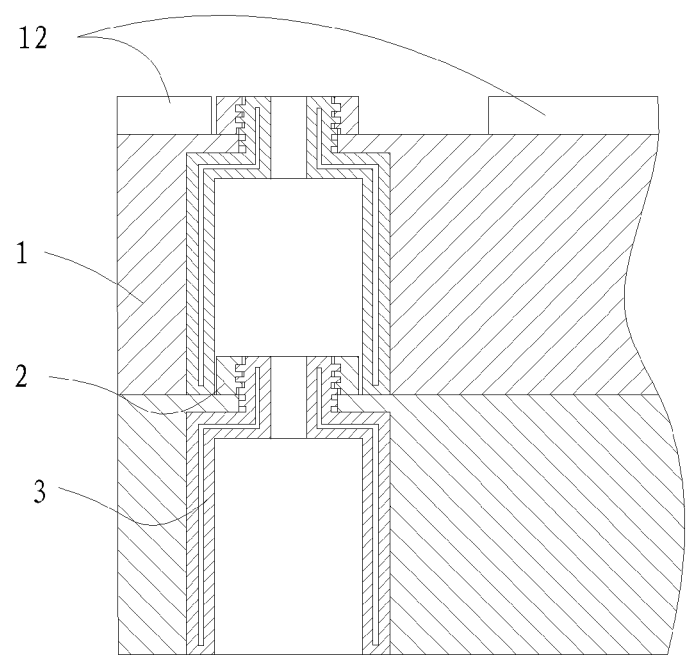
FIG. 4 is a cross-sectional view of the stacked packing boxes of FIG. 1.

As shown in FIGS. 3 and 4, the up surface of the at least one blocking portion 11 of the box body 1 is arranged with a ribbed slab 12. The bottom surface of the box body 1 dents inward to form a step portion 13 corresponding to the ribbed slab 12. When the packing boxes are stacked, the ribbed slab 12 of the packing box located at the lower altitude is within the step portion 13 of the packing box located at the higher altitude.

Internal walls of the at least one pair of opposite blocking portions 11 of the box body 1 are arranged with bosses 14 protruding toward the middle of the box body 1. The boss 14 is arranged, and thus there is a gap between two sides of carried objects and the box body 1. In this way, the carried objects may be easily taken out. In addition, a bottom plate of the box body 1 adjacent to the blocking portion 11 is lower than a middle surface. That is, an arch bearing surface (not labeled) is formed in the middle of the bottom plate of the box body 1. With such configuration, the carried objects are prevented from being stuck within the box body 1. In addition, with such design and also the boss 14, it is easier to take out the carried objects via the bottom surface of the carried objects by hands or tools.

When the packing boxes are stacked, the supporting member 100 may perform precisely positioning toward the box body 1. The ribbed slab 12 engages closely with the step portion 13 so as to increase the contact dimension between the packing boxes, which distributes the pressure for the contacting area so as to protect the carried objects within the packing box.

In addition, the middle of the box body 1 is hollow, which decreases the weight of the packing box and also reduce the manufacturing cost.

In one embodiment, the first supporting member 2, the second supporting member 3, and the box body 1 are integrally blow-formed.

A plastic parison portion corresponding to the hollow portion of the box body 1 includes several pairs of parison portions of the first supporting member 2 and the second supporting member 3 spaced apart from other. After being blow-formed, the first supporting member 2 and the second supporting member 3 may be directly separated from the hollow portion of the box body 1. This blow-formed method not only enhances the manufacturing efficiency but also reduces the manufacturing cost. At the same time, the first supporting member 2 and the second supporting member 3 have buffering capability as being shaped by blow-formed method, which enhances the shock-absorbing capability of the box body 1.

The structure of the packing box is simple and the cost of the packing box is low for the reason that a plurality of supporting members have been arranged on the box body of the packing box. The carrying capability of the packing box may be enhanced without increasing the thickness of the walls of the box body. At the same time, the ribbed slab 12 and the step portion 13 closely contact with each other so as to distribute the pressure between the stacked packing boxes. In addition, the supporting members are shaped by blow-formed process so as to provide multiple protection to the carried objects within the packing box.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A first packing box, comprising:
    a box body comprising an inward concave forming four blocking portions at four sides; and
    a plurality of supporting members arranged at four corners of the box body, each of the supporting members comprises a big head end and a small head end fixedly connecting to the blocking portions, the small head end is arranged above a top surface of the blocking portion, a bottom surface of the big head end comprises an inward concave, the small head end of the supporting member of the packing box is engagable with the big head end of the supporting member of a second packing box stacked above the first packing box, and the big head end of the supporting member of the packing box is engagable with the small head end of the supporting member of a third packing box stacked below the first packing box.

2. The first packing box of claim 1, wherein a middle of the box body is hollow.

3. The first packing box of claim 1, wherein the supporting members and the box body are integrally blow-formed.

4. The first packing box of claim 1, wherein internal walls of at least one pair of opposite blocking portions of the box body are arranged with bosses protruding toward a middle of the box body.

5. The first packing box of claim 4, wherein a bottom plate of the box body adjacent to the blocking portion is lower than a middle surface.

6. The first packing box of claim 1, wherein the top surface of the box body is arranged with a ribbed slab, the bottom surface of the box body dents inward to form a step portion corresponding to the ribbed slab.

7. The first packing box of claim 6, wherein the supporting members and the box body are integrally blow-formed.

8. The first packing box of claim 1, wherein the blocking portion comprises a plurality of through holes and blind holes arranged along a vertical direction, a diameter of the through hole is smaller than the diameter of the blind hole, the small head end and the big head end of the supporting member are respectively a first supporting member and a second supporting member, the second supporting member is inserted to the blind hole, and the first supporting member and the second supporting member form a screw connection to clasp the box body.

9. The first packing box of claim 8, wherein the supporting members and the box body are integrally blow-formed.

10. The first packing box of claim 8, wherein the second supporting member comprises a pillar having exterior threading, the first supporting member is arranged with interior threading, and the pillar passes through the through hole to connect with the first supporting member.

11. The first packing box of claim 10, wherein the supporting members and the box body are integrally blow-formed.

12. The first packing box of claim 10, wherein a bottom surface of the second supporting member aligns with the box body.

13. The first packing box of claim 12, wherein the supporting members and the box body are integrally blow-formed.

* * * * *